United States Patent

[11] 3,614,666

[72] Inventors Jean Louis Ribour
La Celle Saint-Cloud;
Francois Emile Clement Denise, Palaiseau,
both of France
[21] Appl. No. 41,336
[22] Filed May 28, 1970
[45] Patented Oct. 19, 1971
[73] Assignee International Standard Electric Corporation
New York, N.Y.
[32] Priority May 29, 1969
[33] France
[31] 69 17509

[54] TUNING A VARIABLE OSCILLATOR
10 Claims, 9 Drawing Figs.

[52] U.S. Cl. .......... 331/177 V, 331/178, 334/15, 334/16
[51] Int. Cl. .......... H03j 3/18
[50] Field of Search .......... 334/15, 16, 26, 27, 28; 331/178, 177

[56] References Cited

UNITED STATES PATENTS 3,495,195 2/1970 Ribour .......... 331/178

*Primary Examiner*—John Kominski
*Attorneys*—C. Cornell Remsen, Jr., Walter J. Baum, Paul W. Hemminger, Charles L. Johnson, Jr., James B. Raden, Delbert P. Warner and Marvin M. Chaban

ABSTRACT: In a system for automatically tuning a ringing circuit, the voltage vs frequency curve of the ringing circuit is incrementally scanned and compared to a reference voltage. The frequency increments are made twice as large in that portion of the curve above said reference via a second incremental means. When the curve passes its maximum and returns to the reference voltage, the second means is disabled, reducing the frequency interval by one-half thus setting a frequency which corresponds to the maximum of said curve.

Inventors
JEAN L. RIBOUR
FRANCOIS E. DENISE
By [signature]
Attorney

Inventors
JEAN L. RIBOUR
FRANCOIS E. DENISE
By [signature]
Attorney

Inventors
JEAN L. RIBOUR
FRANCOIS E. DENISE
By [signature]
Attorney

Inventors
JEAN L. RIBOUR
FRANCOIS E. DENISE
By [signature]
Attorney

TUNING A VARIABLE OSCILLATOR

The present invention relates to the automatic tuning of a ringing circuit, e.g. an incoming circuit of a radio receiver, or a receiving antenna cabinet, to the frequency of an incoming signal.

A system is known since before, in which the tuning of a ringing circuit is achieved in a digital process by means of variable reactances such as variable capacity diodes. In that system, the natural frequency of the ringing circuit is caused to vary by successive increments towards a given incoming frequency. At each step, the resonance curve of the circuit to be tuned is tested so as to compare its amplitude, on the one hand, at the step considered and, on the other hand, at the next step, and the frequency stroke is stopped as soon as a reversal of the relative values of these amplitudes is stated.

Although it is flexible, this known system shows yet the disadvantage of preventing from a frank detection of the tuned condition with tuning curves of some shapes and particularly so when the top of the resonance curve varies in level from a step to another. It will be stated that tuning sometimes corresponds to a phase reversal in a very small amplitude signal which must be amplified and which is loaded with errors because of the atmospherics which are also amplified.

In order to remedy this disadvantage, the present invention provides a novel system of automatic tuning, which can be carried out in as a simple and inexpensive way as the known system and shows the advantage of allowing a very frank detection of the tuned condition.

The invention is based on a statement that shows that the resonance curve of a ringing circuit is substantially symmetrical in a portion thereof located above a determined level. This being stated, the invention essentially comprises drawing an upper portion of such curve and coming back to its middle point after having determined both its ends. These two ends can be easily determined without any ambiguity.

To these ends, the present invention provides a method of automatic tuning of an adjustable-frequency ringing circuit to a given frequency, which is featured in that it comprises the following steps:

the natural frequency of the ringing circuit is caused to vary by successive increments of simple amplitude towards a given frequency;

the output voltage of the ringing circuit is compared with a reference voltage;

as soon as said output voltage exceeds the reference voltage, said natural frequency is still caused to vary, but by frequency increments of double amplitude;

as soon as the output voltage of the ringing circuit falls down again to the level of the reference voltage, giving out of the frequency increments is stopped;

the frequency increments of double amplitude are replaced by simple amplitude increments, which results in a natural frequency that is equal to the given frequency.

It was stated that in order to attain an almost perfect symmetry of that portion of the resonance curve which lies above the reference level, the difference between the maximum level of the resonance curve and the reference level should be preferably of substantially three decibels. However, this difference can vary within very wide limits without the result being impaired thereby or the method being modified.

In order to obtain easily this reference level without using an outside voltage source the amplitude of which should be adjusted anew at every new tuning operation, the invention also provides the following method:

a first scanning of the resonance curve of the ringing circuit is carried out;

the maximum of this curve is noted;

the maximum recorded is caused to decrease with a large time constant;

the tuning operation proper is carried out during a second scanning of the curve, which is carried out immediately after the first one, and a decreased value of the recorded maximum is used for a reference level.

The present invention also provides a system of automatic tuning for carrying out the above method. According to the invention, this system is characterized in that it comprises:

first incremental means which deliver an analog output signal the value of which is a function of the number of received increments (or steps), these means being started when the system is put into service;

second incremental means, identical with the first ones and connected in addition therewith, said first and second incremental means being adapted to feed the control inlet of the ringing circuit;

an electronic clock which is also started when the system is put into service, and adapted to synchronize the delivery one by one of the increments (or steps) from said first and second incremental means;

and means for comparing a reference voltage with an analog voltage which represents the output voltage of the ringing circuit to be tuned, these means being adapted to deliver a starting signal for said second incremental means when said analog voltage becomes higher than the reference voltage.

The various modifications of the invention are different from the ones the others essentially in the nature and structure of said first and second incremental means.

According to a first embodiment of the invention, said first and second incremental means are formed essentially each of a condenser which is supplied from a circuit which delivers quanta of electricity, in form of pulses, that correspond to the increments.

According to another embodiment of the invention, and which will be described hereinafter more in detail by way of a nonlimitative example, said first and second incremental means are formed each of a binary counter which controls a digital-to-analog converter.

According to a still further embodiment of the invention, said first and second incremental means are formed each of a binary counter which directly controls a variable reactance in the ringing circuit so as to cause a selective variation of the natural frequency of said ringing circuit, which variable reactance can be formed of inductances or condensers, poised according to a given law, associated respectively with the outlets of the corresponding counter and put into service selectively, according to the binary condition of the corresponding outlets.

According to a peculiar feature of the invention, the comparing means comprise two inlet circuits, both supplied with the output voltage from the ringing circuit, the one of said inlet circuits having a large time constant and the other having a small one, and control means for enabling the first inlet circuit alone when the system is put into service, and for enabling only the second inlet circuit after a full cycle of operation of the incremental means.

Other features of the invention will appear from the following detailed description. Of course, the description and drawings are only given in an indicatory way which does not limit the invention.

Figure 1:
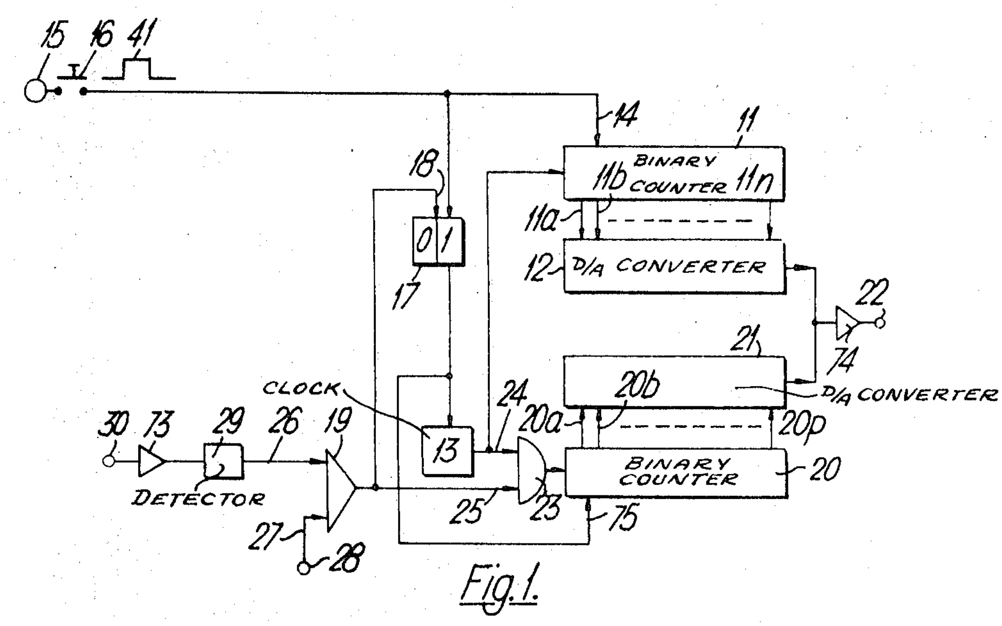
FIG. 1 represents an embodiment of the system according to the invention.

The automatic-tuning circuit, such as it is shown in FIG. 1, comprises a first binary counter 11 the outputs 11*a*, 11*b*... 11*n* of which are connected to a digital-to-analog converter 12 of conventional type, e.g. fitted with resistances. Counter 11 is fed from an electronic clock 13 which delivers pulses at a given frequency, e.g. 5 kHz. A reset inlet 14 of counter 11 is connected to a suitable voltage source 15 by means of a switch 16 which can be, e.g. a pushbutton or an electronic gate controlled during a sequence of some operations that are not defined here.

Clock 13 is put into service by means of a circuit 17 which can be formed by a simple counting flip-flop the inlet "1 " of which, or work inlet, is joint with the reset inlet 14 of counter 11, while the count inlet 18 is connected to a threshold comparator 19.

The system according to the invention comprises a second binary counter 20, similar to counter 11 but having a lower number of flip-flops and the outlets 20*a*, 20*b*... 20*p* of which are connected to a second digital-to-analog converter 21 similar to converter 12.

The outlets from converters 12 and 21 are joined together and deliver, at the output terminal 22, an analog voltage the amplitude of which is a function of the counting positions of counters 11 and 20.

For the purpose stated, the work inlet of counter 20 is connected to the outlet of gate 23 of the AND type and having two inlets, 24 and 25. Inlet 24 is connected to the outlet of clock 13, like the work inlet of counter 11. Inlet 25 is connected to comparing circuit 19, like count inlet 18 of flip-flop 17. A reset inlet 75 of counter 20 is connected to outlet "1 " of flip-flop 17, like the control inlet of clock 13.

Operational amplifiers 73 and 74, of a very conventional type, are arranged at inlet 30 and outlet 22 of the system in FIG. 1.

Comparing circuit 19 has two inlets, 26 and 27. Inlet 27 is connected to a source 28 of reference voltage, while inlet 26 is connected to a detection circuit 29 for the signal delivered by the ringing circuit to be tuned. This ringing circuit may be, e.g. either of the two circuits shown in FIG. 7 and 8. The output terminal 22 of the system in FIG. 1 is connected to the control inlet of the ringing circuit, while the outlet from said ringing circuit is connected to the inlet 30 of the system in FIG. 1.

The example of ringing circuit shown in FIG. 1 will be now described in view of explaining the operation of the automatic tuning system represented in FIG. 1.

The reception inlet 37 of the ringing circuit is connected to a winding 31 the other end of which is connected to ground. Winding 31 is coupled to a secondary winding 32 having one of its terminals connected to ground through a condenser 33 and the other one connected to a variable capacity diode 34 the anode of which is connected to ground.

In a similar manner, the outlet 30 of the ringing circuit is connected to a winding 35 coupled to a winding 36. One of terminals of winding 36 is connected to the output terminal 22 of the system in FIG. 1 through a resistance 38, while the other terminal of winding 36 is connected to a variable capacity diode 39, which is arranged like diode 34. In this embodiment, both ringing circuits are coupled face to face through a condenser 40.

Figure 2:
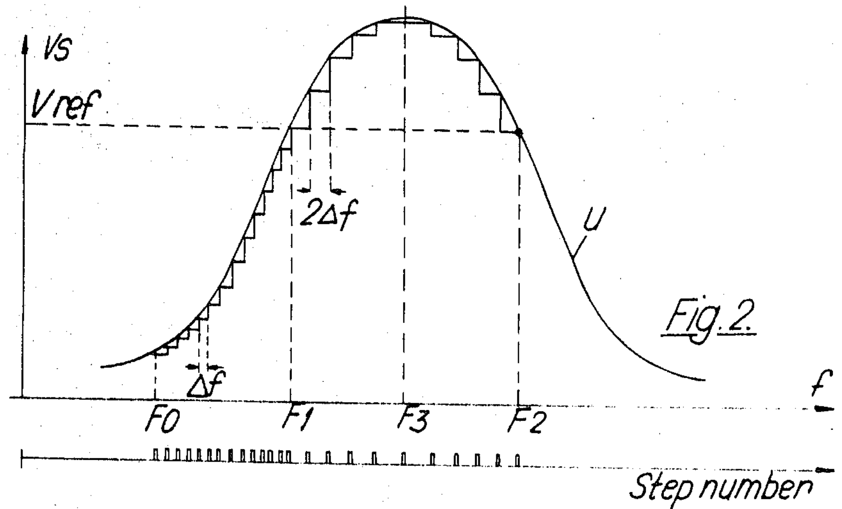
FIGS. 2 and 3 show curves which illustrate the operation of the embodiment of FIG. 1.
Figure 3:
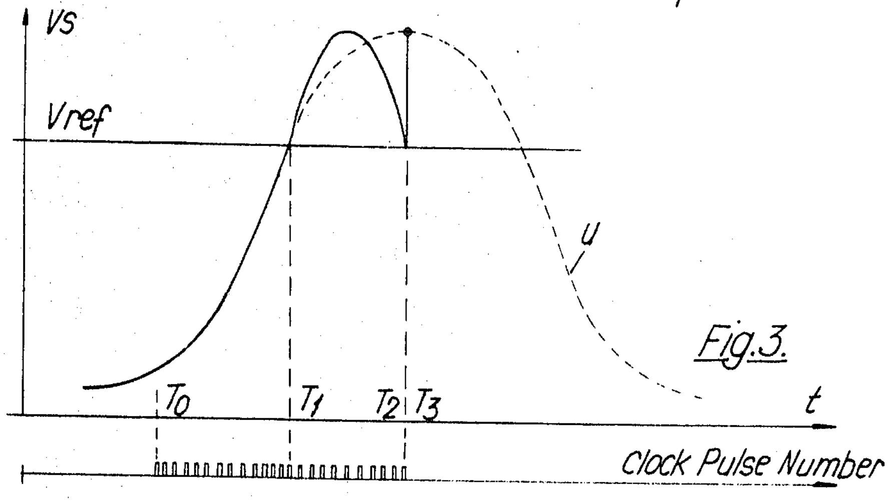

The operation of the system in FIG. 1 is illustrated in FIGS. 2 and 3 both counters 11 and 20 are in the zero condition. By operating a pushbutton switch 16, a pulse of the type shown in 41 is applied to inlet "1 of flip-flop 17 and to inlet 14 of counter 11. The leading side of pulse 41 causes flip-flop 17 to swing into condition 1, which starts at once clock 13. After the rear side of pulse 41, reset inlet 14 of counter 11 is released, so that the pulses delivered by clock 13 to this counter will be registered therein.

Figure 7:
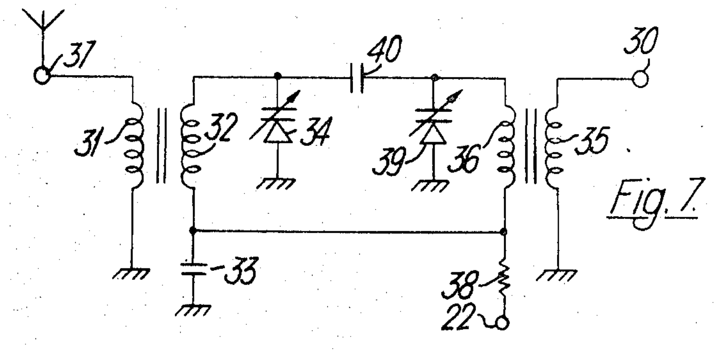
FIG. 7 represents an embodiment of a ringing circuit the natural frequency of which can be adjusted by means of variable reactances formed of variable capacity diodes.

When counter 11 is started, some voltage yielded by converter 12 comes out at the outlet 22 of the system and is applied to the bias inlet of the ringing circuit of FIG. 7. The natural frequency of the ringing circuit is then a frequency $F_0$ (see FIG. 2). Each time another clock pulse is applied to counter 11, converter 12 yields a voltage which causes the natural frequency of the circuit of FIG. 7 by one increment (or step), so that a frequency increment $\alpha f$ corresponds to each increment of the voltage applied. A voltage $V_S$ that appears at the outlet of the ringing circuit is applied to the inlet 30 of the system of FIG. 1 and, after its being detected by circuit 29, it reaches inlet 26 of comparing circuit 19. The overall course of the voltage $V_S$ that appears at the outlet of the ringing circuit forms the resonance curve U of this circuit. So long as the voltage that reached inlet 26 is lower than a reference voltage $V_{ref}$ that is applied to inlet 27, the output from comparing circuit 19 remains "0 ." As the pulses delivered by clock 13 cause counter 11 to progress step by step, voltage $V_S$ grows increment by increment, like a stair, as shown in FIG. 2.

As soon as this voltage exceeds the reference voltage $V_{ref}$, which occurs at a frequency $F_1$, the output from comparing circuit 19 swings from condition 0 to condition 1, inlet 25 assumes condition 1, and the gate 23 of the AND type lets the clock pulses that are applied to its inlet 24 pass. From the instant on, counter 20 is put in service, so that at each pulse from clock 13, converters 12 and 21 that are respectively controlled by counters 11 and 20 progress in synchronism, increment by increment. The voltages yielded by these two converters are added to one another, so that voltage increments of double amplitude come in at the control inlet 22 of the ringing circuit. Frequency increments of a substantially double amplitude ($2\alpha f$ ) correspond to these voltage increments, as shown in FIG. 2.

The frequency curve is then plotted twice so fast, by frequency steps of a double amplitude. When voltage $V_S$ comes down again to the reference voltage, that is at a frequency $F_2$, the output from comparing circuit 19 swings back from condition 1 to condition 0. The downward end of the marking, which is applied to inlet 18 of flip-flop 17, causes the latter to swing back into condition 0. This change of condition results in clock 13 being stopped, as well as in feeding the reset inlet of counter 20. The reset condition of counter 20 suppresses the voltage delivered by converter 21, so that only remains the voltage delivered by converter 12. The value of the latter voltage corresponds to the number of steps from $F_0$ to $F_1$ increased by the number of steps from $F_1$ to $F_2$, all the latter steps having now a simple amplitude. Thus, the voltage applied to control inlet 22 is a voltage that corresponds to $F_1$ increased by half the voltage that corresponds to the interval $F_1$ to $F_2$.

The reference voltage $V_{ref}$ has been so chosen beforehand that the portion of the resonance curve (U) that lies above voltage $V_{ref}$ is symmetrical. Therefore, the bias voltage applied to inlet 22 corresponds to the tuned frequency $F_3$.

FIG. 2 illustrates the operation of the automatic-frequency-tuning system, whereas FIG. 3 illustrates the operation of the system in time. Frequency $F_0$ occurs at instant $T_0$, frequency $F_1$ occurs at instant $T_1$, frequency $F_2$ occurs at instant $T_2$ and frequency $F_3$ occurs at an instant $T_3$ which is practically confused with $T_2$. The pulses from clock 13 are drawn in abscissae.

Figure 4:
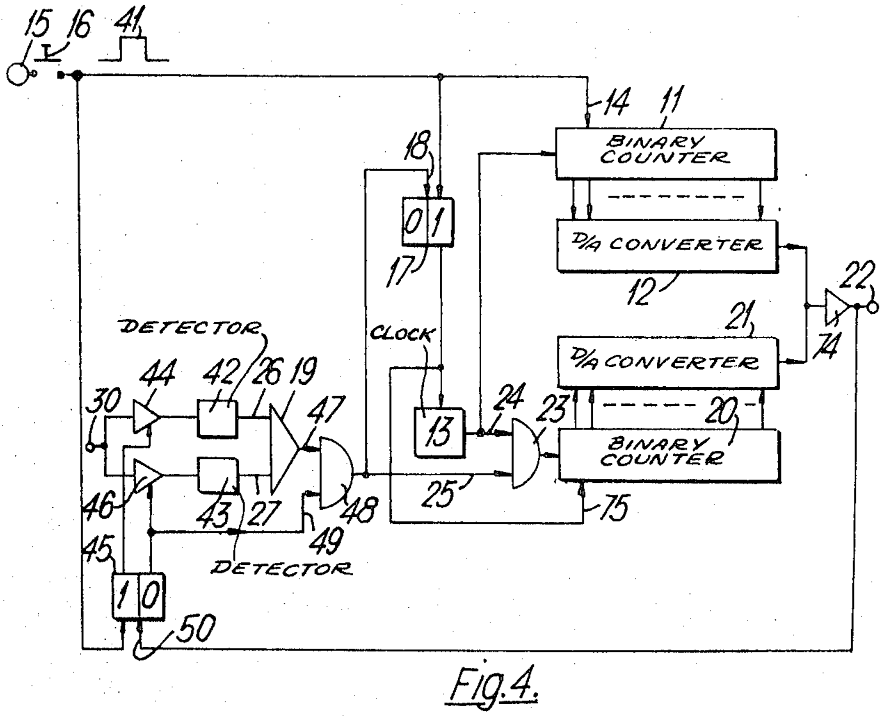
FIG. 4 represents another embodiment of the system according to the invention.

In practice, it shows difficult to adjust and to determine beforehand the level of a reference voltage for every tuning to be carried out. Therefore, according to a preferred embodiment of the invention, the automatic-tuning system of FIG. 4 is provided. This system mainly differs from that of FIG. 1 by the kind of the comparing means. In the system of FIG. 4, the comparing circuit 19 has two incoming circuits respectively connected to its inlets 26 and 27. These two incoming circuits are like, but detector 42 connected to inlet 26 has a time constant which is much larger than that of detector 43 that is connected to inlet 27. On the other hand, the operational amplifier 44 which supplies detector 42 is connected to an outlet 1 of a counting flip-flop 45 which is used for a switching means, whereas the operational amplifier 46 supplies detector 43 is connected to an outlet 0 of flip-flop 45. The outlet of comparing circuit 19 is connected to an inlet 47 of a gate 48 of the AND type, the other inlet 49 of which is connected to outlet 0 of flip-flop 45. The outlet of gate 48 is connected to the inlet 25 of gate 23.

The inlet 1 of flip-flop 45 is connected to the outlet of pushbutton switch 16. A count inlet 50 of flip-flop 45 is connected to the outlet 22 of the automatic tuning system.

Figures 5, 6:
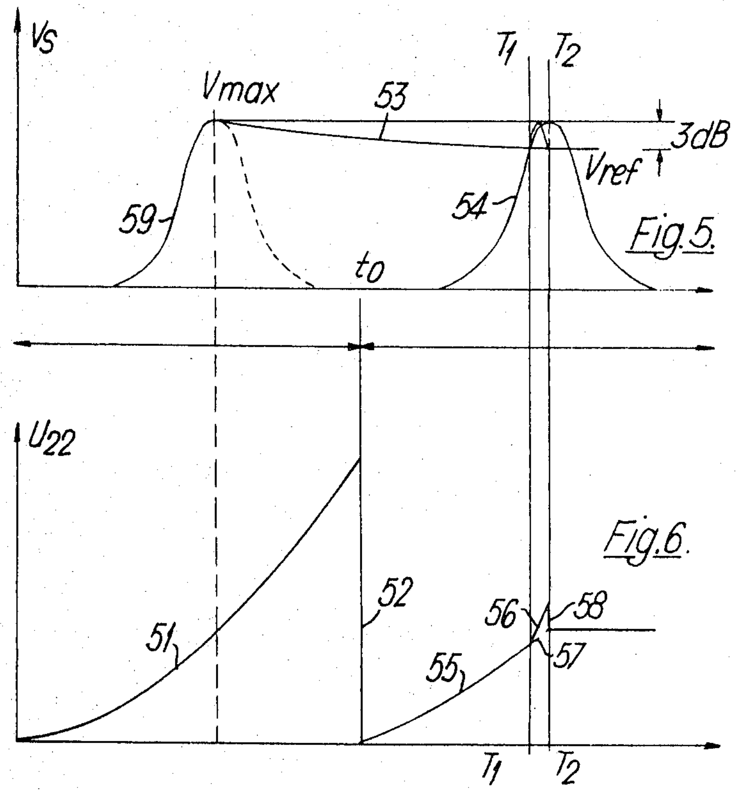
FIGS. 5 and 6 show curves which illustrate the operation of the system of FIG. 1.

In the system of FIG. 4, the tuning operation is practically carried out in two steps. The first step will determine the reference voltage, whereas the second step is used for achieving the tuning proper, in a manner which is identical with that set out with reference to FIG. 1. The overall operation of the system of FIG. 4 is illustrated in FIGS. 5 and 6.

When starting the system, operation of pushbutton 16 yields the pulse 41 the leading side of which causes flip-flops 17 and 45 to swing into condition 1, which, as stated before, puts into service clock 13 and the unit comprising counter 11 and converter 12. Flip-flop 45 in swinging to condition 1 puts into service amplifier 44 and locks operational amplifier 46. Gate 48 stands out of service as flip-flop 45 applies a level 0 to its inlet 49.

A first scanning of the ring circuit is then carried out, which yields a bias voltage $U_{22}$ at inlet 22 of the ringing circuit. The overall course of this voltage is that of the portion 51 of the curve illustrated in FIG. 6. When counter 11 arrives to its end position, it returns to its initial position, so that at the end of the first scanning, there occurs a sudden fall of voltage, represented by the portion 52 of the curve in FIG. 6.

This sudden fall of voltage applies to inlet 50 of flip-flop 45, which flip-flop swings, so that operational amplifier 44 is locked whereas operational amplifier 46 is put into service. Thus, inlet 49 of gate 48 assumes a condition 1, and the signal that appears at inlet 25 of gate 23 is the same as the signal that appears at the outlet of comparing circuit 19 in the above described system of FIG. 1, during the second scanning, which is now started immediately after the first one.

At first, the voltage that appears at inlet 26 of comparing circuit 19 rises according to curve 59 of FIG. 5, i.e. substantially after the resonance curve of the ringing circuit. It passes through a maximum $V_{max}$ of the resonance curve and then decreases according to curve 53 of FIG. 5 because of the large time constant of detector 42. When the voltage at inlet 27 (portion 54 of the curve) becomes higher than the value of the voltage applied to inlet 26 during the second scanning, the system resumes the method of operation which is illustrated in FIGS. 2 and 3. From this instant on, the tuning is achieved exactly in the same way as before.

In order to attain to the best possible tuning, the time constant of detector 42 has its value chosen so that the difference between the maximum level ($V_{max}$) of the resonance curve and the reference voltage that appears at instants $T_1$ and $T_2$ corresponds substantially to an attenuation by 3 decibels.

After the first stroke, the bias voltage that appears at the terminal 22 of the ringing circuit follows the portion 55 of the curve, which is identical with the beginning of the portion 51. From instant $T_1$ on, the second converter 21 goes into service and the voltage slope at outlet $U_{22}$ doubles, as the portion 56 of the curve shows it. The output voltage $U_{22}$ would follow the portion 57 of the curve (shown in dotted line) if converter would not be in service between instants $T_1$ and $T_2$.

From instant $T_2$, counter 20 is reset, so that output voltage $U_{22}$ drops sharply, as shows portion 58 of the curve. From this instant on, clock 13 rests and output voltage $U_{22}$ remains constant and is just the tuned condition voltage.

Figure 8:
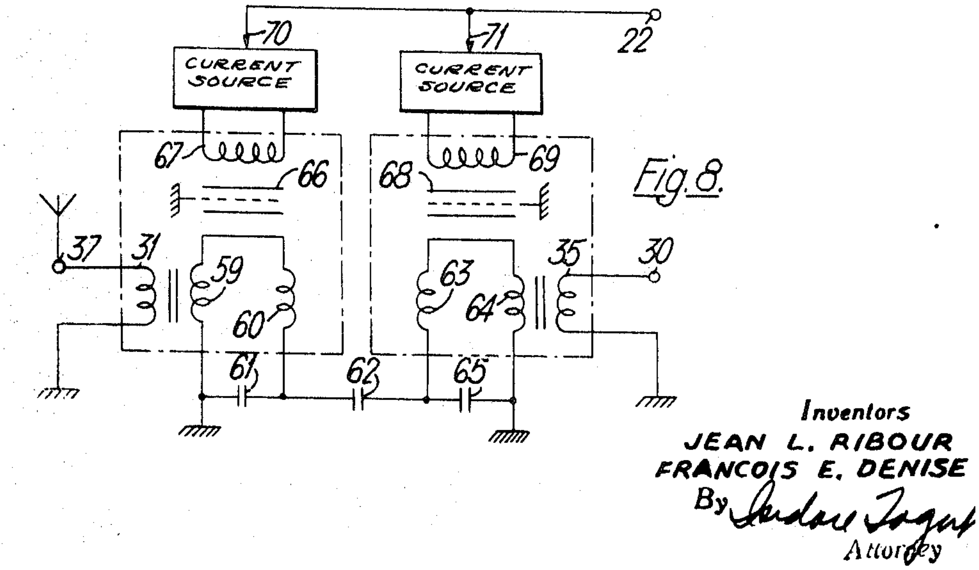
FIG. 8 represents another embodiment of a ringing circuit the frequency of which can be adjusted by means of variable reactances formed of inductances the value of which can be changed by electronic means.

FIG. 8 represents another embodiment of a variable-reactance ringing circuit. In this embodiment, the tuning capacitors are constant and only the inductances have their values variable and adjustable by electrical means. Two secondary windings 59 and 60 are coupled here to winding 31. Windings 59 and 60 are series-connected across a condenser 61. One of the terminals of condenser 61 is grounded and the other is connected to a coupling condenser 62. Likewise, two secondary windings 63 and 64 are coupled to winding 35 and are series-connected across a condenser 65, which is arranged symmetrically to condenser 61. The magnetic core of the first set of coupled circuits (31, 59, 60) is grounded from its screen. Besides, it is magnetically biassed by a winding 67 supplied from an adjustable DC source, which is connected to the outlet 22 of the automatic-tuning system. Likewise, the second set of coupled circuits (35, 63, 64) has a magnetic core 68 grounded from its screen and magnetically biased by a winding 69 supplied from another adjustable source of current 71 identical with source 70 and also connected to terminal 22.

The set of parts 31, 59, 60, 66, 67 is called usually an "increductor."

In the embodiment described with reference to FIG. 8, the ringing circuit comprises two increductors and is only shown, of course, by way of example, The operation of this type of circuit is so known that it is not necessary to describe it more in detail.

Figure 9:
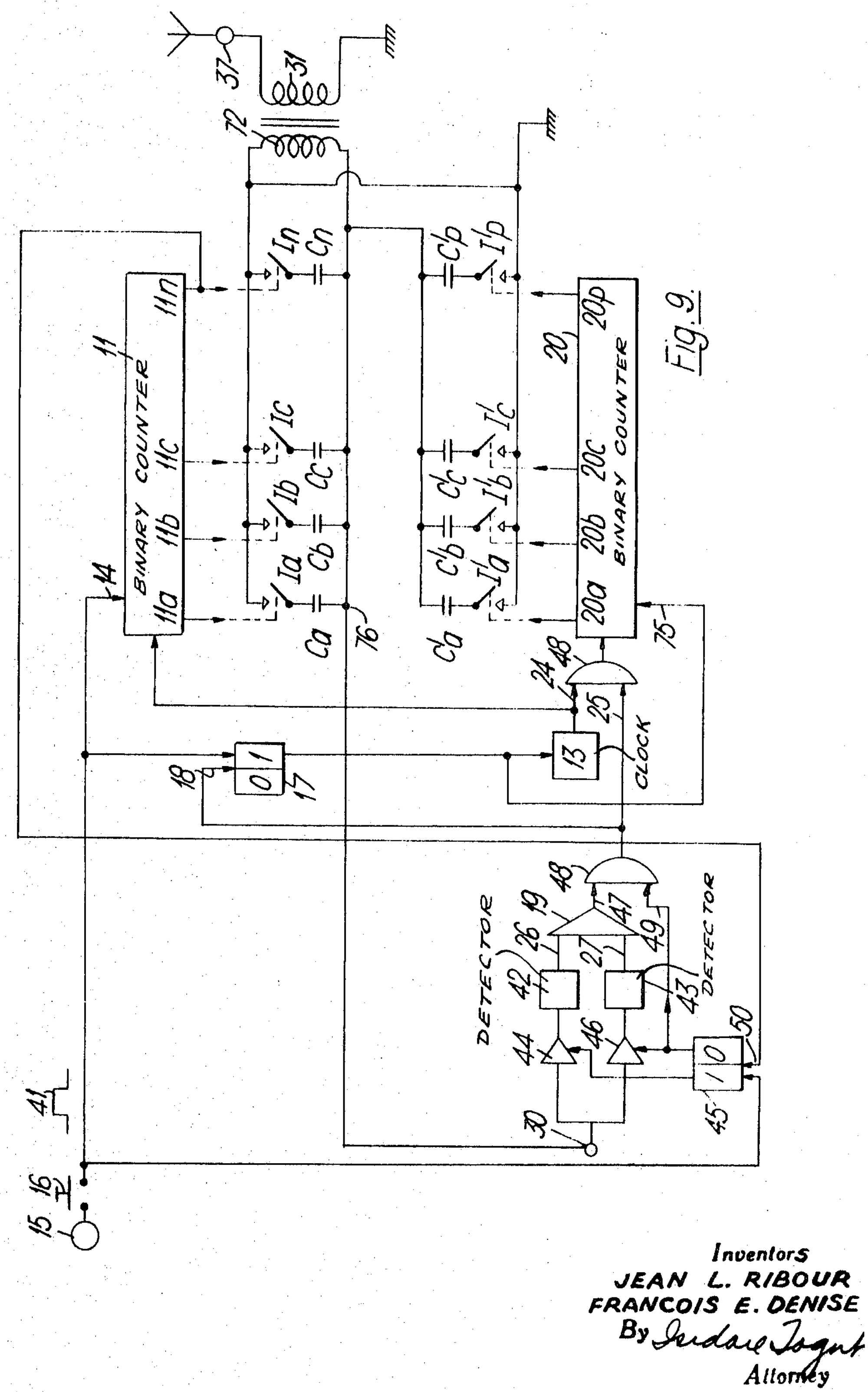
FIG. 9 represents a still further embodiment of a system of automatic tuning according to the invention.

In order to make clear that the invention is not limited to the example just described, another embodiment of the automatic-tuning system is represented in FIG. 9. In a way, each of the digital-to-analog converters of FIGS. 1 and 4 are combined with a corresponding ringing circuit. It can be seen that in this embodiment, the outlets 11*a*, 11*b*...11*n* of counter 11 control respectively the connection of condensers C*a*, C*b*...C*n* , which are arranged in parallel across a secondary winding 72 that is coupled to the incoming primary winding 31. Condensers C*a*, C*b*....C*n* have capacities that form a geometrical progression with a ratio 2. Means for a selective connection of these condensers are shown in a very diagrammatical way as switches I*a*, I*b*....I*n* the control of which depends from the energizing of the corresponding outlets of counter 11, i.e. from the binary condition of these outlets.

Likewise, condensers C'*a*, C'*b*...C'*p* arranged in parallel across winding 72 are associated with counter 20. The connection of these condensers is achieved respectively by switches I'*a*, I'*b*...I'*p* that are closed depending on the energization of the corresponding outlets of counter 20. Switches I*a*...I*n* and I'*a*...I'*p* can be formed e.g. by relays or even merely by transistors adapted to swing either to a locked or to a saturated condition, according to the binary condition of the corresponding outlet of the counter, to which a transistor is connected. The output from the ringing circuit is tapped from a terminal 76 that is common to all condensers C*a*...C*n* and C'*a*...C*p* and connected to terminal 30. The control inlet 50 of flip-flop 45 is connected to the last outlet 11*n* of counter 11.

The operation of this automatic-tuning system is, of course, the same as that which was described before, so that it would be unnecessary to make another description. It can be noticed that in this embodiment, the end of the first scanning stroke is detected by the last outlet 11*n* of the binary counter 11 being reset. In the embodiment of FIG. 4, such resetting occurs at the same time as the voltage drop at outlet 22, which is illustrated by portion 52 of the curve of FIG. 6. Therefore, this resetting could be used in the same way in the embodiment of FIG. 4, instead of using the voltage drop at outlet 22.

It will be well understood that the automatic-tuning system represented in FIG. 9 might comprise inductances instead of the condensers, such inductances being poised according to some determined law, so that depending from the enrgization of the outlets of counters 11 and 20, i.e. from the binary condition of these outlets, a determined number of such inductances would be put into service so as to obtain the required natural frequency.

The invention is not limited to the sole embodiments described and shown, but on the contrary, it extends to any modifications, especially as to the structure of the incremental means, comparing means and ringing circuit.

What we claim is:

1. A method of automatic tuning of an adjustable-frequency ringing circuit to a given frequency, characterized in that it comprises the following steps:

the natural frequency of the ringing circuit is caused to vary by successive steps of a simple amplitude towards the given frequency;

the output voltage from the ringing circuit is compared with a reference voltage;

as soon as said output voltage exceeds the reference voltage, the said natural frequency of the ringing circuit is still caused to vary, yet by successive steps of a double amplitude;

as soon as the output voltage from the ringing circuit comes back to the level of the reference voltage, the frequency steps are stopped being given out;

the frequency steps of a double amplitude that were given out are replaced by frequency steps of a simple amplitude, which results in a natural frequency that is equal to said given frequency.

2. A method according to claim 1, characterized in that the reference voltage is chosen such that the portion of the resonance curve that lies above the level corresponding to this voltage is symmmetrical, wherein the difference between the maximum level of the resonance curve and the reference level can be close to 3 decibels.

3. A method according to claim 1, further characterized by the following steps:

a first scanning of the resonance curve of the ringing circuit is carried out;

the maximum of the curve is registered;

the maximum registered is caused to decrease with a large time constant;

the tuning operation proper is carried out in a second scanning of the curve, which is started at once after the first one, and the somewhat decreased maximum that was registered is used for a reference level.

4. A system of automatic tuning of an adjustable-frequency ringing circuit to a given frequency, for carrying out the method according to claim 1, characterized in that it comprises:

first incremental means adapted to deliver an analog output signal the value of which is a function of the number of increments it has received, these first means being started when the system is put into service;

second incremental means, identical with the first ones and connected in addition therewith, said first and second incremental means being arranged to supply the control inlet of the ringing circuit;

an electronic clock, which is started when the system is put into service for imparting a synchronous delivery of successive increments from said first and second incremental means;

and means for comparing a reference voltage with an analog voltage that is the output voltage of the ringing circuit to be tuned, these means being adapted, when said analog voltage becomes higher than said reference voltage, to deliver a signal which causes said second incremental means to be put into service.

5. A system according to claim 4, characterized in that each of said first and second incremental means is formed essentially by a condenser which is supplied from a circuit that yields quanta of electricity, in form of pulses, corresponding to the increments.

6. A system according to claim 4, characterized in that each of said first and second incremental means is formed of a binary counter which controls a digital-to-analog converter.

7. A system according to claim 4, characterized in that said comparing means are associated with two incoming circuits both supplied with the output voltage from the ringing circuit, the one of said incoming circuits having a large time constant whereas the other has a small one, switching means being provided and adapted to enable only the first incoming circuit when the system is put into service, and to enable only the second incoming circuit after a full cycle of operation of the incremental means.

8. A system according to claim 4, characterized in that the ringing circuit is of a type having variable capacity diodes a bias electrode of which is connected to the outlet of the incremental means and forms the control inlet of the ringing circuit.

9. A system according to claim 4, characterized in that the ringing circuit is of a type comprising increductors the control circuits of which are connected to the outlet of the incremental means.

10. A system of automatic tuning of an adjustable-frequency ringing circuit to a given frequency, according to claim 4, characterized in that each of said first and second incremental means is formed of a binary counter that directly controls the variable reactance in the ringing circuit so as to cause a selective variation of the natural frequency of said ringing circuit, the said variable reactance being formed e.g. of inductances or condensers which are poised according to a determined law and which are respectively associated with the outlets of the corresponding counters and selectively enabled depending on the binary condition of the corresponding outlets.